United States Patent
Horoschak et al.

(10) Patent No.: US 7,512,138 B2
(45) Date of Patent: Mar. 31, 2009

(54) DEVICE. SYSTEM, AND METHOD FOR AUTOMATICALLY DETERMINING AN APPROPRIATE LAN IP ADDRESS RANGE IN A MULTI-ROUTER NETWORK ENVIRONMENT

(75) Inventors: David Horoschak, Doylestown, PA (US); Louis Bifano, Morrisville, PA (US)

(73) Assignee: General Instrument Corporation, Horsham, PA (US)

( * ) Notice: Subject to any disclaimer, the term of this patent is extended or adjusted under 35 U.S.C. 154(b) by 645 days.

(21) Appl. No.: 10/999,732

(22) Filed: Nov. 30, 2004

(65) Prior Publication Data

US 2006/0114835 A1 Jun. 1, 2006

(51) Int. Cl.
*H04L 12/28* (2006.01)
(52) U.S. Cl. .................................. 370/401; 370/395.54
(58) Field of Classification Search ........................ None
See application file for complete search history.

(56) References Cited

U.S. PATENT DOCUMENTS

| | | | |
|---|---|---|---|
| 6,781,982 B1 * | 8/2004 | Borella et al. ................ | 370/352 |
| 7,020,720 B1 * | 3/2006 | Donahue et al. ............. | 709/245 |
| 7,085,836 B1 * | 8/2006 | Turner ......................... | 709/226 |
| 7,283,544 B2 * | 10/2007 | Johnson et al. .............. | 370/401 |
| 2004/0083128 A1 * | 4/2004 | Buckingham et al. ......... | 705/10 |
| 2004/0162992 A1 * | 8/2004 | Sami et al. ................... | 713/200 |

OTHER PUBLICATIONS

Bonnet et al, Connection of Extruded Subnets: A Solution Based on RSIP, IEEE, pp. 116-121, Sep. 2002.*

* cited by examiner

*Primary Examiner*—Frank Duong
(74) *Attorney, Agent, or Firm*—Larry T. Cullen

(57) ABSTRACT

A device, system and method which provides for automatic selection of an alternative private address space by a gateway-router device which is given a private address on its WAN port is disclosed. The present invention provides for a device, system, and method wherein, in a given network topology, if a gateway-router device is given an IP address on its WAN port that is in a private address space then such gateway-router device will automatically select an alternative private address space to use for its DHCP server that will provision addresses to devices interconnected to its LAN port. The above inventive technique eliminates any conflict in private address provisioning.

14 Claims, 3 Drawing Sheets

DEVICE, SYSTEM, AND METHOD FOR AUTOMATICALLY DETERMINING AN APPROPRIATE LAN IP ADDRESS RANGE IN A MULTI-ROUTER NETWORK ENVIRONMENT

FIELD OF THE INVENTION

The present invention relates to digital data networks. More specifically, the present invention relates to data routing using local/private addresses in a digital data network.

BACKGROUND OF THE INVENTION

Broadband services amongst small businesses and home consumers are increasing at a rapid pace. Consistent with this trend is the proliferation of broadband devices which increase end users' capabilities and functionalities, e.g., voice over Internet Protocol ("VOIP") devices. Thus, it is common for an end user to have multiple network devices coupled to a single broadband connection (interface) having only one wide area network ("WAN") Internet Protocol ("IP") address. In order to facilitate easy addition of such devices, many broadband devices contain a Dynamic Host Configuration Protocol ("DHCP") server, to lease out IP addresses, as well as a Network Address Translation Device or "NAT" device, which provides a means for private/local IP addressing. The DHCP functionality combined with NAT features provides a plug and play router for an end user to couple multiple other network devices which the end user wishes to reside on the network. A broadband device containing a DHCP server, and a NAT device is referred to herein as a "gateway-router device". In addition, a gateway-router device may contain other application specific functionality, e.g., VOIP functionality.

A gateway-router device is conventionally connected to a WAN via a broadband interface, such as a cable modem, for example. The gateway-router device sits as an intermediary between the broadband interface and a plurality of network devices. (Please note that alternatively the broadband interface and gateway-router device may be integrated into one device.) In operation, the gateway-router device has both a WAN side (port 1) and a local area network ("LAN") side (port 2). (Please note that many gateway-router devices may have multiple physical ports on the LAN side, however, these multiple physical LAN side ports are all interconnected to one logical LAN port with a unique address (port 2).)

On the WAN side, the gateway-router device communicates with the WAN, via the broadband interface, typically using the single WAN IP address, made known to the gateway-router device from the broadband interface. On the LAN side, the gateway-router device is interconnected with the plurality of network devices which the end user wishes to utilize on the network. Such network devices may include a personal computer(s) ("PC"), file server(s), web server(s), printer(s), gaming device(s)/controller(s), etc. (hereinafter referred to as "LAN devices" for simplicity of explanation).

Upon request from a LAN device, the gateway-router device's DHCP server provides a private (or LAN) IP address to each requesting LAN device. Such private addresses may be leased from the gateway-router device in a wide range of schemes such as random; sequential order, based upon the sequential order of requester; etc.

Thus, for example, if an end user has two LAN devices, namely a web server and a client PC, if the web server requests a private address first, it will be given a first sequential private IP address, 192.168.1.2 (for example). If the client PC is the next requester, it will be given the next sequential private IP address, 192.168.1.3 (for example). (The gateway-router device will give its LAN port the first address in the private address space, 192.168.1.1, in this example.) Thus, private addresses are leased out by the DHCP server and translated by the NAT, thereby giving LAN devices their own network identity, yet enabling them to access the WAN without conflicting with each other.

The above configuration works in perfect harmony, from a routing point of view, until a second gateway-router device is added. If a second gateway-router device is introduced into a network which already has a first gateway-router device (where the WAN side of the second gateway-router device is communicatively connected to the LAN side of the first gateway-router device), there exists the possibility of conflicting private addresses. It is important to note that the address space ranges for private addresses have been pre-defined by The Internet Assigned Numbers Authority ("IANA") to a finite group. Currently that finite group comprises the following three blocks: 10.0.0.0; 172.16.0.0; 192.168.0.0.

In conventional systems, if the first gateway-router device leased out private addresses in the address space of 192.168.X.X, there is nothing preventing the second gateway-router device from leasing out private addresses in the same private address space. Thus, in current systems, it is possible, for a first gateway-router device and a second gateway-router device to lease out the same private addresses to different devices, e.g., leasing out private address 192.168.1.3 to two (2) different LAN devices (one LAN device interconnected to the first gateway-router device, and another LAN device interconnected to the second gateway-router device). Therefore, in current network topologies, where two gateway-router devices co-exist, there is a potential for misconfiguration and communication problems if multiple DHCP servers of each gateway-router device in a network, respectively, are simultaneously attempting to provision IP addresses in the same private address space.

What is needed is a device, system and method to prevent the simultaneous provisioning of private IP addresses in the same private address space by multiple gateway-router devices residing on the same LAN.

SUMMARY OF INVENTION

An object of the present invention is to prevent the simultaneous provisioning of private IP addresses in the same private address space by multiple gateway-router devices residing on the same LAN.

In order to achieve this objective, as well as others which will become apparent in the disclosure below, the present invention provides a device, system and method which provides for automatic selection of an alternative private address space by a gateway-router device which is given a private IP address on its WAN port.

In an exemplary embodiment of the present invention, a device, system, and method are provided wherein in a given network topology, if a gateway-router device is given an IP address on its WAN port that is in the space of the pre-defined private addresses (see above), then such gateway-router device will automatically select an alternative private address space to use for its DHCP server that will provision addresses for LAN devices communicatively connected to its LAN port. The above inventive technique eliminates any conflict in private IP address provisioning. Thus, the device, system, and method of the present invention makes gateway-router devices resides on the same LAN smart enough to configure their DHCP servers to avoid network conflicts.

Thus, the system, device and method of the present invention prevent the simultaneous provisioning of private IP addresses in the same private address space by multiple gateway-router devices residing on the same LAN.

BRIEF DESCRIPTION OF THE DRAWINGS

For a complete understanding of the present invention and the advantages thereof, reference is now made to the following description taken in conjunction with the accompanying drawings in which like reference numbers indicate like features, components and method steps, and wherein.

DESCRIPTION OF A PRESENTLY PREFERRED EMBODIMENT

Figure 1:
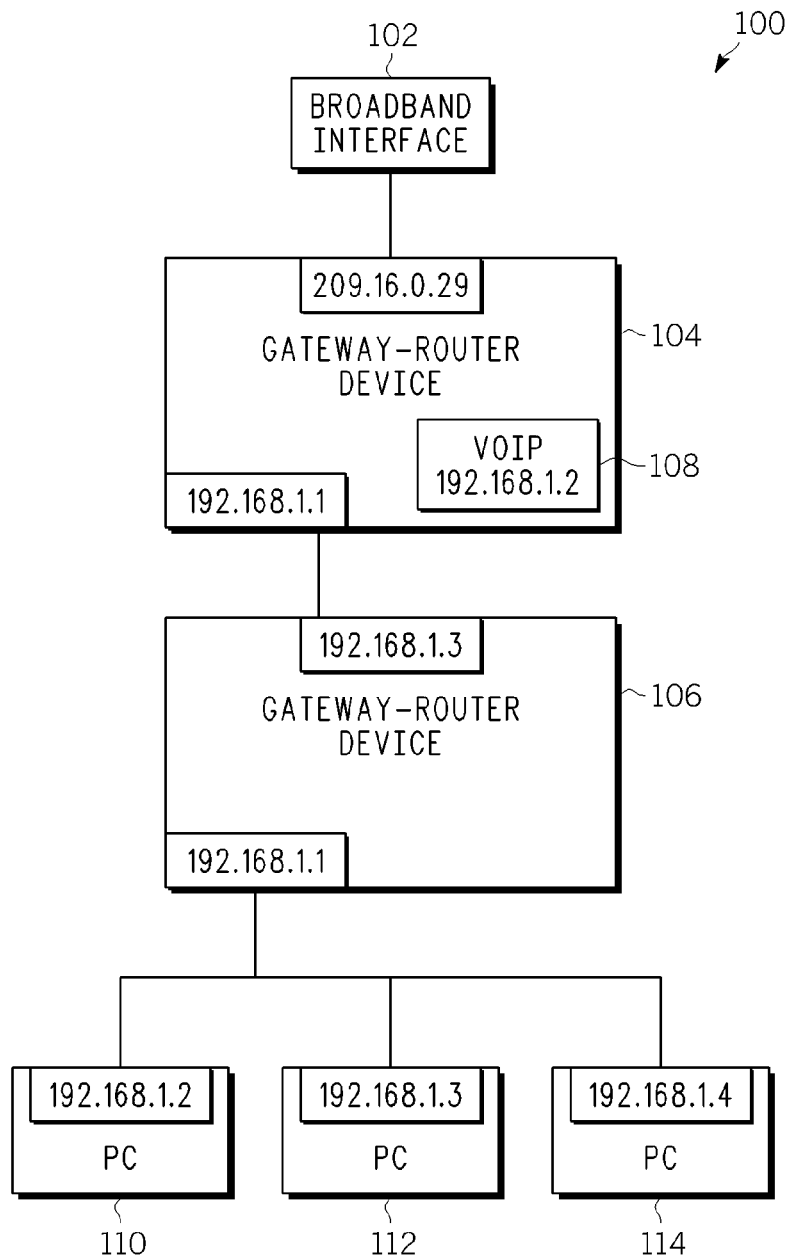
FIG. 1 is an illustration of a prior art system containing multiple gateway-router devices residing on the same LAN.

It is essential to comprehend conventional functionality of multiple gateway-router devices residing on the same LAN in order to understand the substance of the present invention. Referring to FIG. 1, a prior art system 100 is shown. System 100 includes a broadband interface 102, a first gateway-router device 104 and a second gateway-router device 106. Here the broadband interface 102 is connected to a broadband network and is also interconnected to the WAN port (port 1) on the first gateway-router device 104. Once connected, the broadband interface 102 provides the first gateway-router device 104 with a single unique WAN IP address, 209.16.0.29 (for example). Further, assume that the first gateway-router device 104 incorporates application specific functionality therein, in this instance a VOIP telephone 108. Thus, the VOIP telephone 108, even though internal, will appear as a LAN device to the first gateway-router device 104. The DHCP server within the first gateway-router device 104 will pick a private address space from which to lease private addresses from a finite list of pre-defined address blocks (see above), 192.168.1.X in this example. The first gateway-router device 104 will give its own LAN port a private address of 192.168.1.1 and the VOIP telephone 108 a private address of 192.168.1.2.

The LAN port of the first gateway-router device 104 is interconnected to the WAN port of the second gateway-router device 106. Here, the second gateway-router device 106 will request an IP address for its WAN port, but since it is interconnected directly to the first gateway-router device 104 (not a broadband interface 102), the first gateway-router device 104 will give the second gateway-router device 106 the requested address on the WAN side of the second gateway-router device 106. Since the first gateway-router device 104 can only lease out private IP addresses, it will lease the WAN port of the second gateway-router device 106 a private IP address in its private address space. In this example, the first gateway-router device 104 leases private address 192.168.1.3 to the second gateway-router device 106.

The second gateway-router device 106 has a plurality of LAN devices interconnected (whether physically or wirelessly) to its LAN port. Here, client PCs 110, 112 and 114 are interconnected to the LAN side of the second gateway-router device 106. The client PCs 110, 112, 114 will request IP addresses from the second gateway-router device 106. Since the second gateway-router device 106, similar to the first gateway-router device 104, can only lease out private IP addresses, the second gateway-router device 104 will select a private address space, from the pre-defined private address space ranges, which to lease out addresses to client PCs 110, 112, 114.

If the second gateway-router device 106 choose 192.168.1.X as its private address space, it will give its LAN port a private address of 192.168.1.1, and client PCs 110, 112, 114, private addresses of 192.168.1.2; 192.168.1.3, and 193.168.1.4, respectively.

As can clearly be seem from FIG. 1, there is a potential for misconfiguration and communication problems if multiple DHCP servers of each gateway-router device in the same LAN, respectively, are simultaneously attempting to provision IP addresses in the same private address space. Here, there are address conflicts with (i) the client PC 110 and the VOIP telephone 108; (ii) the LAN ports of the gateway-router devices 104, 106, and (iii) the WAN port of the second gateway-router device 106 and client PC 112. This type of address conflict can lead to drastic data problems and miscommunication.

Figure 2:
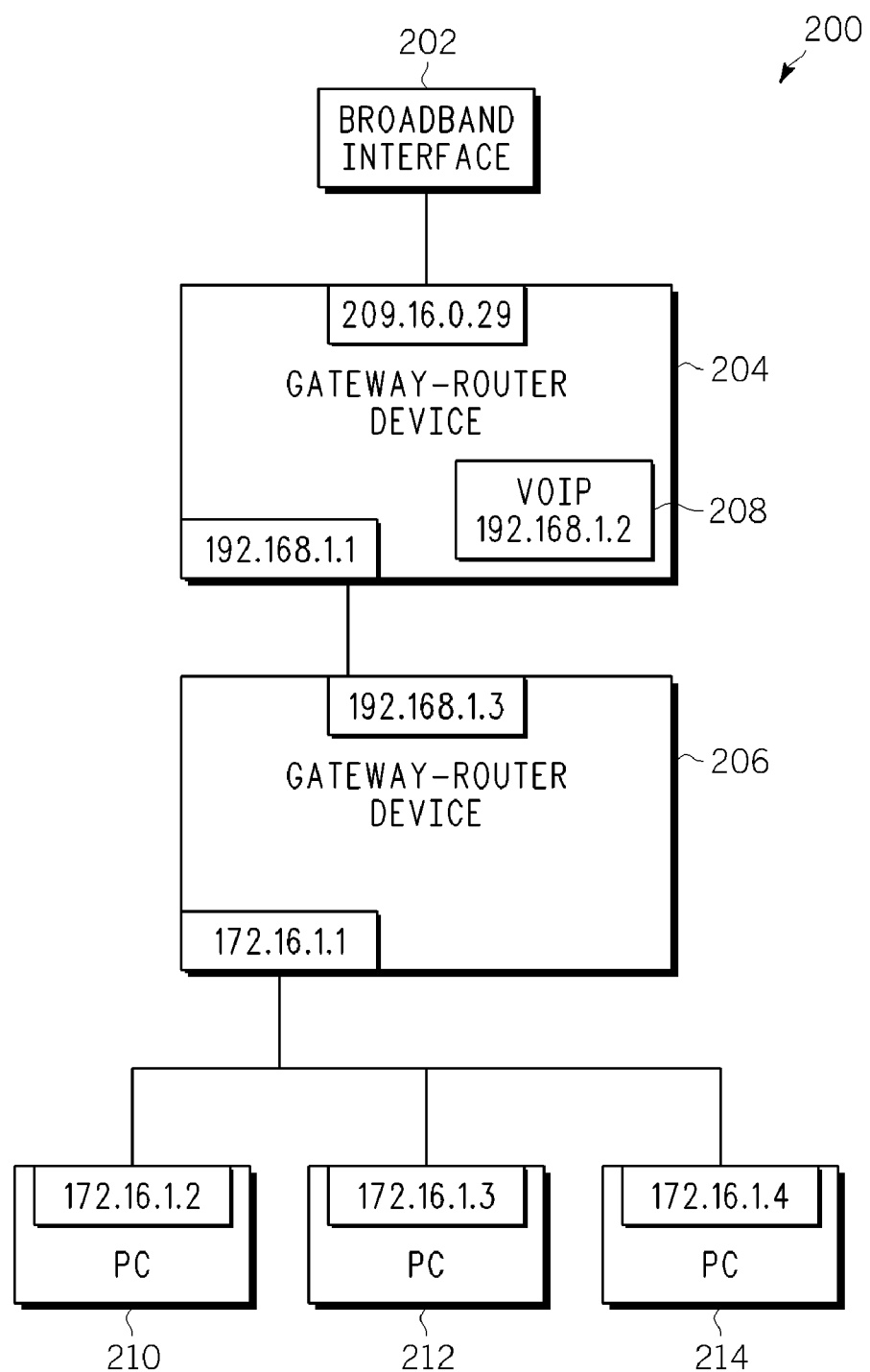
FIG. 2 is an illustration of a system for preventing the simultaneous provisioning of private IP addresses in the same private address space by multiple gateway-router devices residing on the same LAN in accordance with an exemplary embodiment of the present invention.

Referring to FIG. 2, system 200 is shown which alleviates the above-described private IP address conflicts of conventional system 100. System 200 includes a broadband interface 202, and inventive gateway-router devices 204, 206 in accordance with an exemplary embodiment of the present invention. The first gateway-router device 204 also incorporates application specific functionality therein, in this instance a VOIP telephone 208. As such the first gateway-router device 204 needs to be interconnected directly to the broadband interface 202 to ensure that the VOIP telephone 208 can be given data priority by the first gateway-router device 204.

The LAN port of the first gateway-router device 204 is interconnected to the WAN port of the second gateway-router device 206. Further, the second gateway-router device 206 has a plurality of LAN devices interconnected (whether physically or wirelessly) to its LAN port. Here, client PCs 110, 112 and 114 are interconnected to the LAN side of the second gateway-router device 106.

Figure 3:
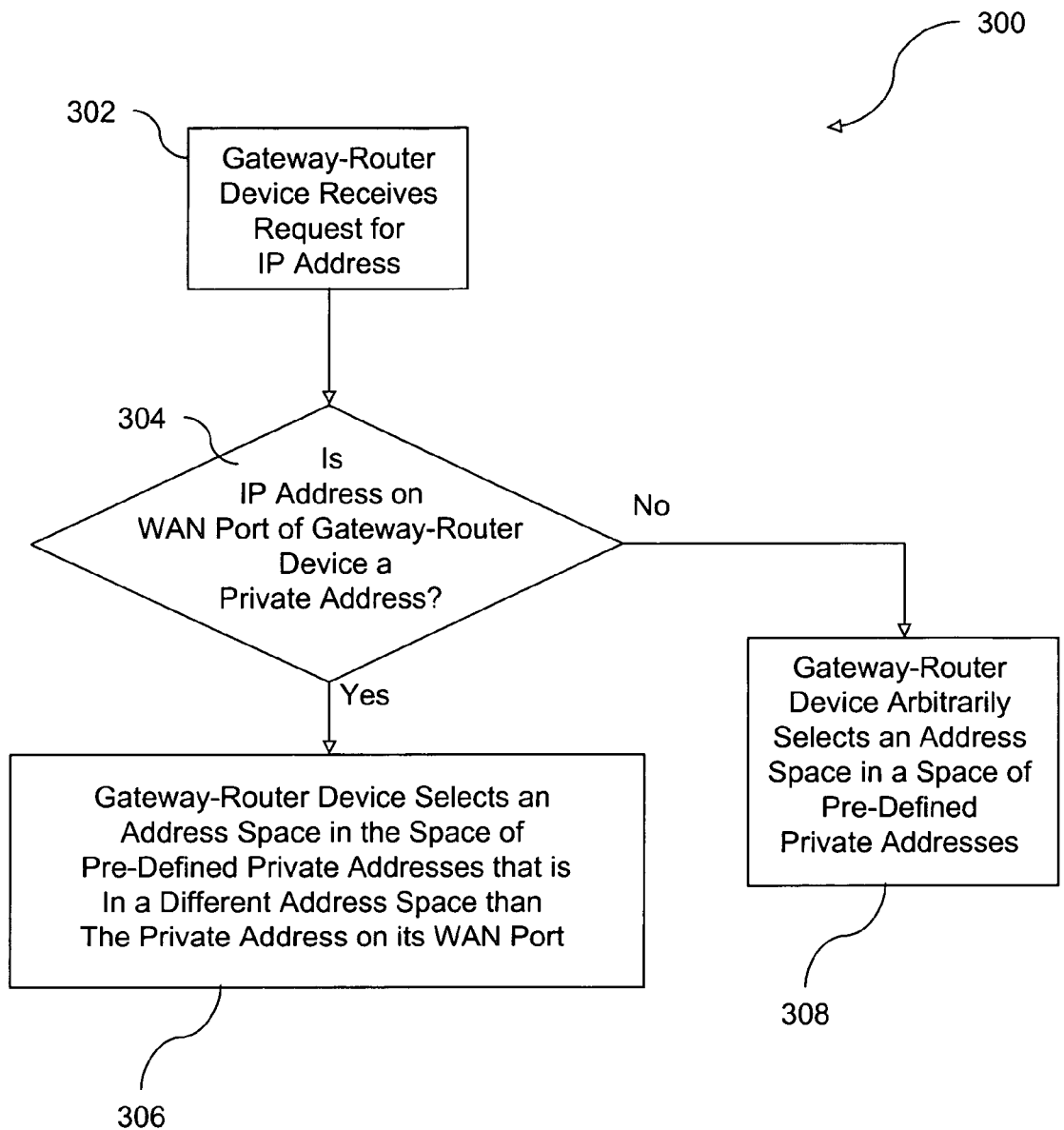
FIG. 3 is a flow diagram showing the basic process flow for preventing the simultaneous provisioning of private IP addresses in the same private address space by multiple gateway-router devices residing on the same LAN in accordance with an exemplary embodiment of the present invention.

With the exception of the application specific functionality (VOIP telephone 208) of the first gateway-router device 204, the first and second gateway-router devices 204, 206 both embody the inventive method shown in FIG. 3.

Referring to FIG. 3, where an inventive gateway-router device 204, 206 of the present invention receives a request for a private IP address from a LAN device(s) connected thereto, in step 302, the inventive gateway-router device 204, 206 will first determine whether the IP address of its WAN port is a private IP address, in step 304. If the IP address on the WAN port of an inventive gateway-router device 204, 206 is not a private address, the inventive gateway-router device 204, 206 arbitrarily selects a private address space (from the list of pre-defined private address spaces) from which to assigned a private IP address to its LAN port and to lease private IP address to requesting LAN devices, in step 308. If the IP address on the WAN port of an inventive gateway-router device 204, 206 is a private IP address, the inventive gateway-router device 204, 206 automatically selects an alternative private address space (from the list of pre-defined private address spaces) from which to assigned a private IP address to its LAN port and to lease private IP address to requesting LAN devices, in step 306.

Here, referring to FIG. 2, since the first gateway-router device 204 has a WAN address on its WAN port, it will arbitrarily select a private address space for it LAN port and to lease to its LAN device connected thereto. Thus, the first gateway-router device 204 will give its LAN port an address of 192.168.1.1, its VOIP telephone a private address of 192.168.1.2 and the WAN port of the second gateway-router device 206 a private address of 192.168.1.3.

Since the second gateway-router device 206 has a private address of 192.168.1.3 on its WAN port, it will automatically, select an alternative private address space (not in the address block of 192.168.X.X.) for it LAN port and to lease to LAN device connected thereto. Here, the second gateway-router device 206 selects the alternative private address space of 172.16.1.X. Thus, the second gateway-router device 204 will give its LAN port an address of 172.16.1.1, its client PCs 210, 212, 214 private address of 172.16.1.2; 172.16.13 and 172.16.1.4, respectively.

Thus, the device, system and method of the present invention prevent the simultaneous provisioning of private IP addresses in the same private address space by multiple gateway-router devices residing on the same LAN.

Although the present invention has been described herein by reference to an exemplary embodiment thereof, it will be understood that such embodiment is susceptible of modification and variation without departing from the inventive concepts disclosed. All such modifications and variations, therefore, are intended to be encompassed within the spirit and scope of the appended claims.

We claim:

1. A gateway router device for preventing the simultaneous provisioning of local area network (LAN) addresses in the same LAN address space by multiple gateway-router devices residing on the same LAN, said device comprising:
   a first network port;
   a second network port; and
   a dynamic host configuration protocol server, said server leasing LAN addresses in response to requests, and wherein if said device has a LAN address within an address space of allocable LAN addresses on said first network port, said LAN address being assigned by a different device and said server leasing LAN addresses within a second address space of allocable LAN addresses on said second network port which are not in the same address space as said LAN address on said first network port.

2. The device of claim 1 further comprising a network address translator, said translator providing translation between addresses on said first network port with addresses on said second network port.

3. The device of claim 1, wherein said first network port comprises a wide area network (WAN) port.

4. The device of claim 1, wherein said second network port comprises a LAN port.

5. A system for preventing the simultaneous provisioning of local area network (LAN) addresses in a first LAN address space of LAN addresses allocable by multiple gateway-router devices residing on the same LAN said system comprising:
   a first gateway-router device, said first gateway-router device having a first and second network ports; and
   a second gateway router device, said second gateway-router device having a first and second network ports, wherein said first port of said second gateway-router device is interconnected to said second port of said first gateway-router device and uses a LAN address from the first LAN address space of allocable LAN addresses to communicate with the second port of the first gateway-router device, said LAN address being assigned by the first gateway-router device, wherein said second gateway-router device leases LAN addresses in a second LAN address space of allocable LAN addresses which is not the same as the first LAN address space.

6. The system of claim 5, wherein said first gateway-router device further comprises a network address translator, said translator providing translation between addresses on said first network port with addresses on said second network port of said first gateway-router device.

7. The system of claim 5, wherein said second gateway-router device further comprises a network address translator, said translator providing translation between addresses on said first network port with addresses on said second network port of said second gateway-router device.

8. The system of claim 5, wherein said first network port of said first gateway-device comprises a wide area network (WAN) port.

9. The system of claim 5, wherein said second network port of said first gateway-network device comprises a LAN port.

10. The system of claim 5, wherein said first network port of said second gateway-device comprises a wide area network (WAN) port.

11. The system of claim 5, wherein said second network port of said second gateway-network device comprises a LAN port.

12. A method for preventing the simultaneous provisioning of local area network (LAN) addresses in the same LAN address space by multiple gateway-router devices residing on the same LAN, said method comprising:
   determining if an address on a first network port of a device is a LAN address within an address space of allocable LAN addresses, said LAN address being assigned by a different device; and
   leasing out at least one LAN address within a second address space of allocable LAN addresses on a second network port of said device which are not in the same address space of said address on said first network port if said address on said first network port is a LAN address.

13. The device of claim 12, wherein said first network port comprises a wide area network (WAN) port.

14. The device of claim 12, wherein said second network port comprises a LAN port.

* * * * *